Nov. 21, 1961                L. J. O'DELL                3,009,538
                        HORIZONTAL GAS SCRUBBER
Filed May 16, 1958                              2 Sheets-Sheet 1
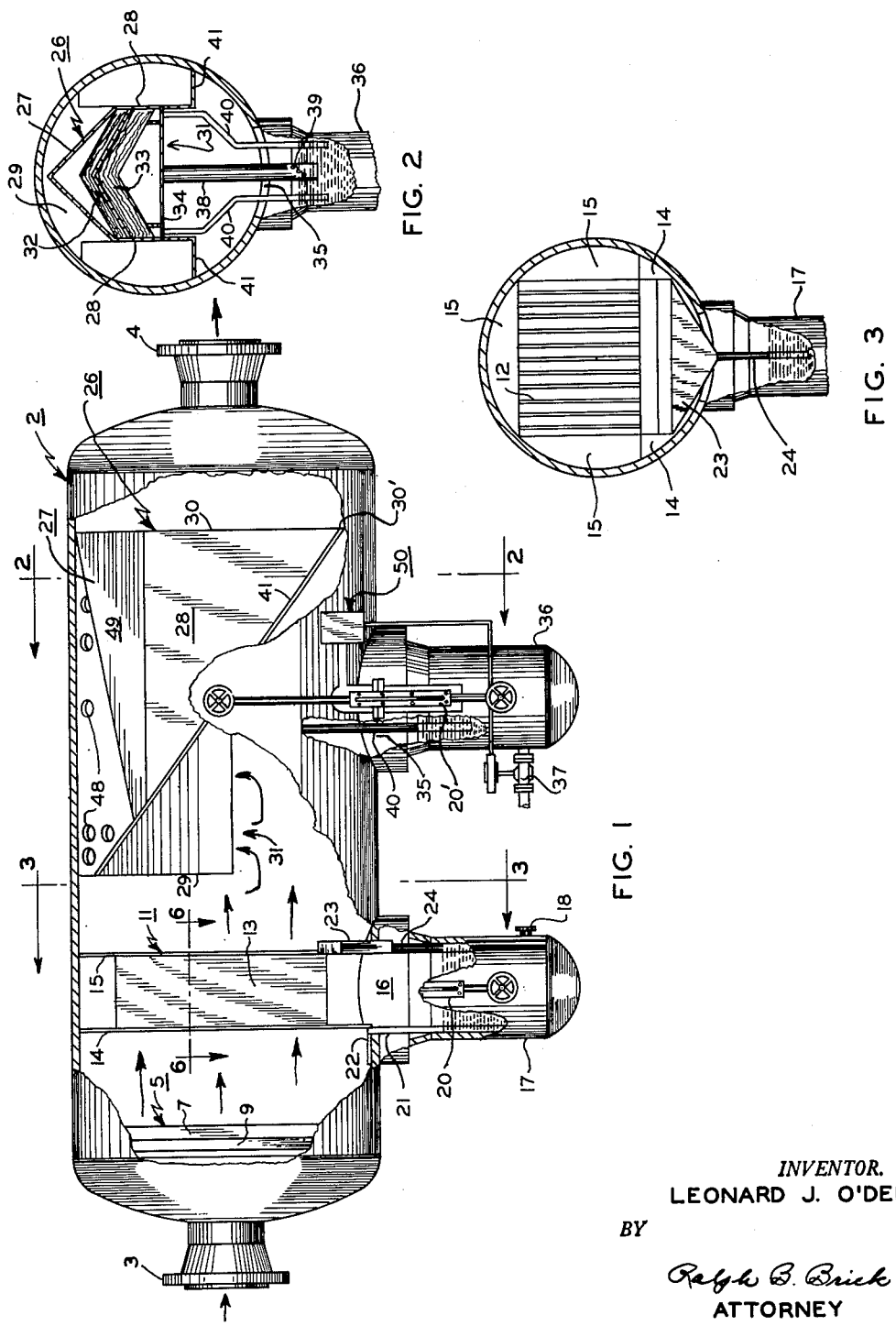
INVENTOR.
LEONARD J. O'DELL
BY
Ralph B. Brick
ATTORNEY Nov. 21, 1961 L. J. O'DELL 3,009,538
HORIZONTAL GAS SCRUBBER
Filed May 16, 1958 2 Sheets-Sheet 2
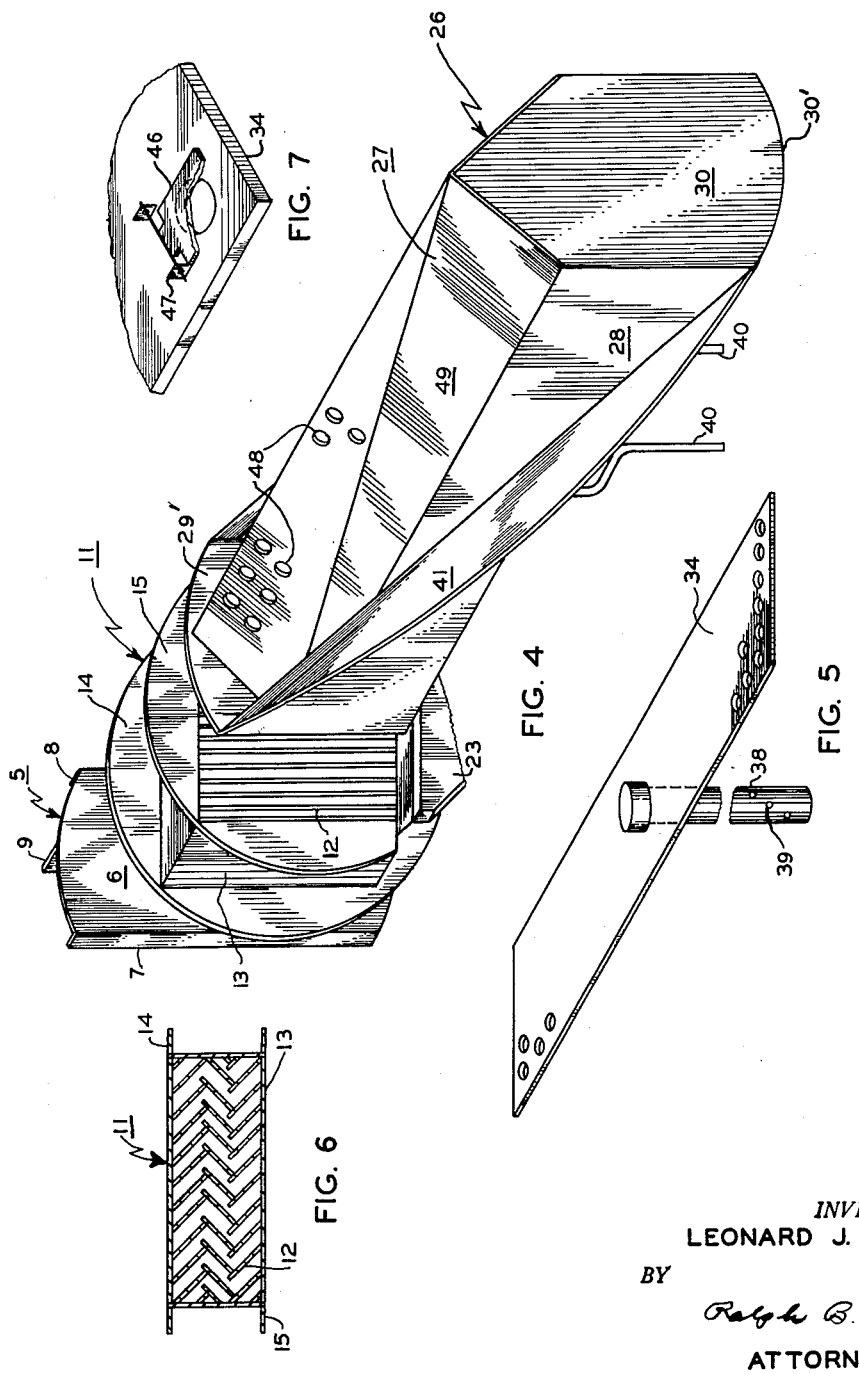
INVENTOR.
LEONARD J. O'DELL
BY
Ralph B. Brick
ATTORNEY

United States Patent Office 3,009,538
Patented Nov. 21, 1961

3,009,538
HORIZONTAL GAS SCRUBBER
Leonard J. O'Dell, Louisville, Ky., assignor to American Air Filter Company, Inc., Louisville, Ky., a corporation of Delaware
Filed May 16, 1958, Ser. No. 735,836
10 Claims. (Cl. 183—31)

This invention relates to a method and apparatus for cleaning gas and more particularly to a method and apparatus for removing liquids, foreign matter, dust and mist from a contaminated gas stream.

In industrial installations involving gas transmission lines, gathering lines, gas storage fields, chemical plants, petroleum chemical plants, and the like, there has been a constantly growing demand for a system whereby contaminated gas can be cleaned in such a manner as to effectively remove high contaminant concentrations in the gas over a wide range of gas velocities with a minimum of gas pressure drop. A number of different gas cleaning arrangements have been provided in the past to meet the ever growing demands of the various industries but for a number of reasons these past arrangements have had limited effectiveness. For one thing, these past arrangements have been limited as to the volumes of gas they have been capable of effectively handling. For another, they have been limited in their effective operation to a narrow range of gas velocities. Further, they have been limited by the filtering units which they have employed for gas cleaning, the filtering units used presenting problems of increased resistance and sludge deposit with resulting undesirable increased gas pressure drop and inefficient operation of the overall gas cleaning unit. In addition, these past arrangements have been limited in their ability to operate continuously and efficiently over long periods of time, the operations of these past arrangements being constantly interrupted to permit maintenance and repair.

The present invention provides a method and apparatus for cleaning gas particularly suited for operations in the above-mentioned industrial installations but which avoids the above-mentioned limitations and disadvantages of previous gas cleaning arrangements. In accordance with the present invention, it is possible to remove effectively various contaminants from large volumes of gas in a gas cleaning arrangement which incorporates and effectively utilizes the combined optimum advantages of two separately known principles for removing liquids and other contaminants from gas, which combined arrangement presents a minimum of resistance to such gas and which combined arrangement, at the same time, includes a control over the velocity of the large volumes of gas as they are cleaned. To accomplish these desirable results the present invention provides a gas cleaning method which maintains the velocity of large volumes of gas substantially equal or uniform throughout as the gas is passed from a liquid eliminator zone and through a filter zone, which stabilizes the velocity of the gas so that it is substantially constant as the gas is passed through such filter zone, and which presents a minimum of gas pressure drop as the gas is passed through such zone. In addition, the present invention provides an apparatus for carrying out the inventive gas cleaning method which is straightforward in its construction and maintenance, which requires a minimum of moving parts during its operation and which can operate continuously and efficiently even when normal maintenance is required.

Various other features of the invention will become obvious to one skilled in the art upon reading the disclosure set forth herein.

More particularly the present invention provides a method of cleaning a high concentration of contaminants from large volumes of gas comprising the steps of passing such large volumes of gas in substantially the same general direction of flow and at a substantially uniform velocity throughout through a liquid eliminator zone of short depth and great cross-sectional area to remove liquids from such gas, changing the direction of flow of the gas substantially 90° after it leaves the liquid eliminator zone, controlling the velocity of the gas so that it is substantially uniform throughout after it has changed its direction of flow, passing the gas through a filter zone which also is of short depth and great cross-sectional area to permit maximum removal of other contaminants in the gas with a minimum of gas flow resistance, and controlling the velocity of the gas as it passes through the filter zone so that it remains substantially constant as it passes therethrough.

In addition, the present invention provides a gas cleaning apparatus to carry out the inventive method including a vessel having spaced gas inlet means and gas outlet means, a liquid eliminator disposed in the vessel downstream the gas inlet means, a filter disposed in the vessel between the liquid eliminator and the gas outlet means with the inlet side of the filter extending in a plane substantially parallel to the longitudinal axis of the vessel, a first means to stabilize the velocity of the gas to be cleaned as it passes through the filter so that such velocity is substantially constant, and a second means to maintain the velocity of the gas uniform throughout as it passes through such filter and to form a seal between the periphery of the filter and the inner wall of the vessel.

It is to be understood that various changes can be made by one skilled in the art in the several steps of the method disclosed herein and in the arrangement, construction and shape of the several parts of the apparatus disclosed herein without departing from the scope or spirit of the present invention.

Referring to the drawings which disclose one advantageous embodiment of the present invention:

FIGURE 1 is a partially cut away elevational view of the inventive gas cleaning apparatus, disclosing gas flow through the several component parts of the apparatus;

FIGURE 2 is a reduced partially cut away cross-sectional view taken in a plane passing through line 2—2 of FIGURE 1;

FIGURE 3 is a reduced partially cut away cross-sectional view similar to that of FIGURE 2 taken in a plane passing through line 3—3 of FIGURE 1;

FIGURE 4 is an enlarged, exploded, perspective view of some of the components in the gas cleaning apparatus of FIGURE 1, disclosing in more detail a portion of the liquid eliminating section and the gas cleaning section;

FIGURE 5 is an enlarged, perspective view of additional components of the gas cleaning apparatus of FIGURE 1, disclosing a liquid lift arrangement for the liquid treatment of gas in cooperation with the gas cleaning components disclosed in FIGURE 4;

FIGURE 6 is a cross-sectional view of the mist eliminator component of the apparatus disclosed in FIGURE 1, taken in a plane passing through line 6—6 of FIGURE 1;

FIGURE 7 is an enlarged perspective view of a corner of a liquid distributing plate of a modified liquid lift arrangement with velocity stabilizing means for gas passing therethrough.

Referring to FIGURE 1 of the drawings, the gas cleaning apparatus is disclosed as including a vessel 2 having a gas inlet nozzle 3 positioned at one end of the vessel and a gas outlet nozzle 4 positioned at the other end thereof. In the advantageous embodiment of the invention disclosed herein, the vessel is shown with its longitudinal axis in a horizontal position but it is to be understood that the present invention is not restricted to vessels only so positioned.

Disposed within vessel 2 adjacent gas inlet nozzle 3 is an impervious baffle 5 (FIGURES 1 and 4) which can be of abrasive resistant material such as hard rubber. The main body 6 of baffle 5 extends partially across vessel 2 in a plane transverse the longitudinal axis of the vessel with the upper and lower edges of the main body engaging the inner wall of the vessel and being held in place against such wall by some desirable means such as welding or bolting. Baffle 5 is provided with side walls 7 and 8 integral with the main body 6 and an intermediate wall 9, the walls 7, 8 and 9 each being positioned at a 90° angle to the main body to form corner traps therewith which face toward the gas inlet nozzle 3. It is to be noted that each of side walls 7 and 8 is spaced from the inner wall of vessel 2 to provide a passage therebetween through which the incoming gas may flow after it has impinged against baffle 5. In this connection, it is also to be noted that when the incoming gas passes through gas inlet nozzle 3 it impinges against main body 6 of baffle 5 to thus eliminate a large percentage of any liquid which might be in the gas, the traps formed by the side walls and intermediate wall insuring further liquid elimination before the gas passes through the passages formed between the side walls of the baffle and the inner wall of the vessel 2.

Spaced downstream from baffle 5, also in a plane transverse to the longitudinal axis of the vessel, is a second baffle 11 which also serves as a liquid mist eliminator. Referring particularly to FIGURE 6 of the drawings, it can be seen that baffle 11 includes a series of spaced zig-zag plates 12 positioned in vessel 2 within an open faced rectangular frame 13. The plates 12 form within such frame 13 a plurality of tortuous passages extending in the general direction of the gas stream as it passes from the gas inlet 3 to the gas outlet 4 of the vessel. It is to be noted that zig-zag plates 12 are provided with overlapping edge portions to form a series of traps which face the general direction of gas flow along the tortuous paths formed between the plates. With the baffle 11 as described, any entrained liquid remaining in the gas after its impingement against baffle 5, including any mist in the gas, is removed by a combined impingement action, a centrifugal-like motion and surface tension as the gas passes through baffle 11. Thus, an effective means for eliminating any liquid in the gas passing through vessel 2 is provided by the combined baffle arrangements 5 and 11. In this connection, it is to be understood that the subject invention is not to be considered as limited to the liquid mist eliminator arrangement as disclosed but that other liquid mist eliminating arrangements can be used depending upon the nature of the gas stream to be treated. For example, only one of the two eliminators 5 and 11 need be used when it is known that the liquid concentrate in the gas stream is to be low.

It is to be noted that in order to prevent any of the gas from passing around the rectangular frame 13 of baffle 11 and thus bypass this baffle, sealing walls 14 are provided to completely encircle baffle 11 at the upstream side of the baffle between the periphery of the frame 13 and the inner wall of vessel 2 (FIGURE 1). These sealing walls also serve to support the frame 13 in vessel 2. Further, support walls 15 are provided at the downstream side of the baffle 11 between the periphery of frame 13 and the inner wall of vessel 2. In this connection, it is to be noted that support walls 15, unlike walls 14, do not completely encircle the periphery of frame 13 to seal the same off, but that an opening is provided at the lower portion of the downstream side of the frame 13 to permit uninterrupted communication between the space formed below baffle 11 and the vessel 2 and the space in vessel 2 downstream of baffle 11. The reason for this arrangement will be seen hereinafter.

To accommodate any liquid removed from the gas as it passes through baffles 5 and 11, a liquid outlet 16 is provided in the lower portion of vessel 2 below the baffle 11. Positioned below outlet 16 and attached to the lower outside wall of vessel 2 is a sump 17 which serves as a reservoir for the extracted liquid. Sump 17 is provided with an outlet 18 which ordinarily is maintained closed during operation but which can be opened in the event the liquid level in the sump should rise to an undesirable height in the sump. In this connection, it is to be noted that sump 17 is provided with a conventional liquid level gauge 20 to permit visual determination of the level of the liquid in the sump and thus avoid any back flooding of liquid into the lower portion of vessel 2. It is to be understood that, if desired, an automatic level control can be incorporated with the sump. The automatic level control (not shown) can be any one of a number of well known types such as those which use a power operated or gas pressure valve control mechanism responsive to a float arrangement in the sump to control an outlet valve in outlet 18 of the sump and thus the liquid level in such sump.

To drain the liquid extracted by baffle 5, a drain pipe 21 extending into liquid outlet 16 before seal wall 14 is provided. The upper end of pipe 21 extends through a plate 22 which seals off outlet 16 from that portion of vessel 2 upstream baffle 11. Pipe 21 is arranged to extend deep into sump 17 so as to always be below the liquid level therein and thus prevent any gas passage through the sump. To drain the liquid extracted by baffle 11, a trough-like funnel 23 is provided at the lower, rear portion of frame 13 and extending into outlet 16, the liquid draining into the trough-like funnel and then through a pipe 24 connected to the funnel. It is to be noted that pipe 24, like pipe 21, also extends into the sump well below the liquid level maintained therein.

Positioned downstream of the liquid eliminating baffles 5 and 11 is a gas cleaning apparatus broadly designated by the reference numeral 26. Apparatus 26 is disclosed as being in the form of a house having a gabled roof portion 27 spaced from the inner wall of vessel 2, substantially vertically extending gas impervious side walls 28 spaced from the inner wall of vessel 2, and upstream and downstream gas impervious end walls 29 and 30 respectively. It is to be noted that the upper portion of upstream end wall 29 extends into a gas impervious panel 29' which is attached to the inner wall of vessel 2 by some suitable means such as welding or bolting while the lower portion of end wall 30 and the downstream portion of side walls 28 have downwardly depending portions which extend to edge 30'. Edge 30' is fastened to the lower portion of vessel 2. The bottom of the house-like gas cleaning apparatus 26, that is the bottom face of the apparatus, comprises the gas inlet side thereof, and is broadly designated by the reference numeral 31 (FIGURES 1 and 2). Gas inlet side 31, as it is hereinafter referred to, extends in a plane substantially parallel to the longitudinal axis of vessel 2 and is spaced from the bottom of the vessel to permit gas to be cleaned to enter along the entire length thereof into the inside of gas cleaning apparatus 26. It also is to be noted that this gas inlet area 31 can be substantially larger than the cross sectional area of the vessel 2, its size being restricted only by the length of vessel 2. Thus, large volumes of gas can be handled simultaneously by apparatus 26 without increasing the cross section of vessel 2.

Positioned within the interior of the house-like gas cleaning apparatus 26 which serves as a gas treating compartment, are a pair of series arranged gable-shaped filter pads 32 and 33 (FIGURE 2), these pads being spaced from each other by any suitable spacing means (not shown) and serving to separate any dust particles from the gas as it passes through such pads. The pads can be constructed from any suitable viscous impingement type material, such as crimped wire or knitted mesh and can be formed into a mass of desired density. These pads each have a face area somewhat larger than that of gas inlet 31 so as to be able to accommodate a like volume of gas. The pads, however, are of relatively small depth to thus avoid undesirable gas resistance and pressure drop.

To keep the pads continuously wet with a viscous liquid, a liquid treating arrangement can be provided similar to that described in assignees' co-pending application Serial No. 703,136 which has matured into Patent No. 2,966,958, granted January 3, 1961. This arrangement includes a horizontal, apertured liquid distribution plate 34 which extends across the inlet side 31 of apparatus 26 to abut against the lower edges of the upstream portion of side walls 28 against the lower edge of upstream end wall 29 and against the inner sides of the downstream depending portions of side walls 28 and the downstream end wall 30.

Positioned below plate 34 in the wall of vessel 2 (FIGURE 1) is a second outlet opening 35 and attached to the outside of vessel 2 adjacent outlet 35 so that the outlet 35 opens thereunto is a liquid sump 36. Sump 36 is designed to be of sufficient capacity to accommodate viscous liquid to be circulated to apertured plate 34. The sump is provided with an outlet arrangement 37 which like outlet 18 of sump 17 is maintained ordinarily in a closed position during operation of the gas cleaning apparatus but which can be opened in the event the liquid level should rise to an undesirable height in the sump. As with sump 17, sump 36 is provided with a conventional liquid level gauge 20' to permit visual determination of the level of liquid in the sump and thus avoid any back flooding of liquid into the lower portion of vessel 2. Also, as with sump 17 and if so desired, an automatic level control can be incorporated with sump 36 and, as aforementioned, such control can be any one of a number of well known types such as those which use a power operated or gas pressure valve control mechanism responsive to a float arrangement in the sump to control the outlet valve of the sump and thus the liquid level in such sump. Such a control mechanism is shown broadly in FIGURE 1 of the drawings by reference numeral 50.

With the arrangement described, it is thus possible to use only a minimum of viscous liquid and to avoid, at all times, the collection of liquid in the bottom of vessel 2. This is most desirable since a collection of liquid in vessel 2 would result not only in undesirable sludge deposits and the difficult maintenance problems associated therewith but, in addition, liquid collection in vessel 2 would offer resistance to gas flow and, by its very presence, tend to distort the effectiveness of the baffle control arrangement, described hereinafter, which serves to insure a uniform velocity of the gas throughout as the gas passes through gas cleaning apparatus 26. It is to be noted that, as an additional measure for avoiding the collection of liquid in bottom of vessel 2, sumps 17 and 36 are, in effect, in direct communication with each other through vessel 2 so that if there should be a liquid overflow in one sump, such liquid would not remain in vessel 2 but would pass to the other sump. This feature is obtained by avoiding any sealing wall (as aforementioned) below the downstream side of baffle 11. Not only does such a feature prevent collection of liquid in vessel 2 and undesirable sludge deposits but, in those instances where automatic level control equipment is used, one unit located, for example on sump 36 could serve both sumps in an emergency since any overflow in one sump would pass to the other sump.

In order to lift the viscous liquid from sump 36 to the apertured liquid distribution plate 34, a vertically disposed conduit 38 (FIGURE 5) is provided, which conduit is similar to that disclosed in FIGURE 1 of abovementioned Patent No. 2,966,958. The upper end of conduit 38 opens to plate 34 and the lower end is immersed in and opens to the viscous liquid in sump 36. The lower portion of conduit 38 is provided with a series of relatively small holes 39 in the wall thereof. These holes extend from below the static liquid level in the sump progressively upward to a point somewhat above this level. When the gas to be cleaned passes from baffle 11 to the gas inlet side 31 of gas cleaning apparatus 26 and through apertured plate 34, a portion of the gas passes through conduit 38, carrying the viscous liquid in a finely divided state up the conduit to the downstream side of the crimped filter pads. Some of the viscous liquid particles are carried directly into contact with the filter pads while other particles tend to fall on the surface of plate 34. The liquid on the surface of the plate tends to migrate to the edges of the apertures therein where it forms into shoulder-like masses which are picked up and carried to the pads by the gas flowing upwardly through these holes. The gabled pads thus are fed continuously with viscous liquid droplets or particles which coat the pad material and catch the dust and other particulate matter in the gas flowing through the pad. The viscous liquid and dirt drain from the pads by virtue of their gabled shape and drain conduits 40 which extend from the lower edges of the pad 33 into the sump 36. Details of the principle by which the viscous liquid is circulated from sump 36 to the pads of the cleaning apparatus are set forth fully in abovementioned Patent No. 2,966,958 and therefor are not repeated herein. It is to be understood that the present invention is not limited to the aforedescribed means of liquid circulation and, if so desired, other liquid circulating means such as a pump connected to a line from the sump can be used.

The present invention recognizes that to obtain full efficiency of the filter apparatus it is important to obtain uniformity of velocity of the gas to be cleaned throughout as it passes through the apertured plate 34 and the pads 32 and 33 so that the velocity of the gas toward the upstream portion of the gas inlet side 31 of the gas cleaning apparatus 26 is substantially the same as the velocity at the downstream portion of the gas inlet side 31. If no control of gas velocity is effected as the gas passes from the baffle 11 through the cleaning apparatus 26, it is recognized by the present invention that there would be little or no filtering of the gas at the upstream portion of the gas apparatus 26 toward end 29 because the gas would sweep toward the downstream portion of the gas inlet side 31 toward end 30 and gas outlet nozzle 4. At such downstream portion of the apparatus 26 the velocity of the gas would be so high as to exceed allowable filter velocities for gas passing through the plate and filter pads. As a result, there would be undesirable liquid entrainment at that area. On the other hand, at the upstream portion of apparatus 26, low velocities would occur. This would result in poor liquid distribution on the apertured plate 34 and might even result in oil draining off the plate into the bottom of vessel 2. Furthermore, the net effect of such poor distribution eventually would result in pad plugging on the gas inlet side of the filter pads since little or no viscous liquid would be fed for filter pad cleaning purposes. To avoid these many disadvantages and to permit the filter pads to be positioned with the inlet face thereof in a plane parallel to the longitudinal axis for maximum gas volume cleaning capacity, the present invention provides a baffle arrangement 41 between the peripheral or outer side of house-like gas cleaning apparatus 26 and the inner wall of vessel 2. This baffle arrangement 41, in addition to forming a seal between the outer periphery of apparatus 26 and the inner wall of the vessel 2 so as to prevent the gas from bypassing the cleaning apparatus 26, serves to assure a substantially uniform or equal velocity of the gas from the upstream end (wall 29) to the downstream end (wall 30) of apparatus 26 as it passes through the apparatus. This is accomplished by sloping the baffle in such a manner that it provides an incrementally decreasing inlet zone adjacent the inlet side 31 of the apparatus 26 as said inlet side 31 approaches the gas outlet nozzle 4 of vessel 2. At the same time, the baffle provides an incrementally increasing outlet zone adjacent the outlet side of the gas cleaning apparatus 26 as the outlet side approaches the gas outlet 4 of vessel 2. It has been found that with such an arrangement, the velocity of the gas to be cleaned can be maintained uniform throughout as it passes into the inlet side 31 of apparatus 26 and through the filter arrangement therein.

As is set forth in assignee's co-pending application Serial No. 308,454, under the name of Arthur Nutting and Robert Sexton, which has matured into Patent No. 2,889,004, granted June 2, 1959, by controlling the openings in apertured plate 34 the velocity of the gas through the filter pads can be determined, the minimum size of the apertures being such that there is always a sufficient minimum velocity of the gas as it passes through such apertures to insure liquid pick-up. As also is set forth in Patent No. 2,889,004, it is possible to provide means for the apertures which permit control over the gas velocity as it passes through apparatus 26 even though such velocities may vary as the gas leaves baffle 11 of the vessel. The present invention recognizes that under certain conditions it might be desirable to combine this feature into the structure described hereinabove and thus make it possible not only to accommodate large volumes of gas in an efficient gas cleaning apparatus but also to accommodate such large volumes of gas over large gas velocity ranges which occur so often in industrial installation. Thus, the gas velocity can be held substantially constant and, in effect, stabilized. In this connection, attention is directed particularly to FIGURE 7 of the drawings which discloses a representative structure similar to that set forth in aforementioned Patent No. 2,889,004 which permits such gas velocity control and stabilization. The structure is straightforward in its nature, comprising flapper valve 46 which is connected to plate 34 by a conventional two part hinge 47. As described in Patent No. 2,889,004, when the gas cleaning apparatus is operating, a pressure differential is created between opposite sides of valve 46. When this differential barely exceeds the weight of such valve, the flapper valve 46 automatically opens slightly, permitting a small amount of air flow therethrough. The area of each opening is restricted by its design and this can be such as to be just enough to insure a gas velocity sufficient for pick-up of the viscous liquid on the plate surface. The volume of gas across the opening determines the extent to which the valve is opened. If the inlet velocity of the gas rises, the pressure drop rises and the valve is caused to open to a greater degree. With this increased opening, the velocity of the gas passing through such opening decreases and thus a gas velocity stabilization effect is obtained. In this connection, it also is to be understood that by increasing or decreasing the weight of the flapper valve or by otherwise controlling its ability of movement, such as by spring means, it is possible to further control the degree of valve opening.

Finally, referring to FIGURE 4 of the drawing, it is to be noted that gabled roof 27 of the gas cleaning housing apparatus 26 is provided with a plurality of apertures 48 therein on the outlet side of the apparatus before the outlet nozzle 4 of vessel 2. As can be seen in FIGURE 4, these outlet apertures 48 can be distributed in a specific arrangement in combination with a secondary baffle arrangement 49 to further control the velocities of the gas in conjunction with baffle 41 to further insure uniform velocities of gases passing vertically through apparatus 26 from the upstream end 29 to the downstream end 30 thereof.

In a typical operation of the present invention, a volume of gas to be cleaned is directed in substantially the same general direction through gas inlet nozzle 3 of vessel 2 and through the liquid eliminating zone which is made up of impingement baffle 5 with its liquid traps and mist eliminator baffle 11 with its tortuous passages. Baffle 11 has a large face area and a relatively small depth to permit maximum gas volume handling capacity with a minimum of gas resistance and resulting gas pressure drop. After the liquid is extracted from the gas, the gas is passed from the liquid eliminating zone to a second gas cleaning zone, which in the advantageous embodiment disclosed includes the gas cleaning apparatus 26. As the gas passes from the liquid eliminating zone, its direction of flow is changed substantially 90° and, as it is passed into the inlet side 31 of the filter zone, the velocity of the gas is controlled so that it is substantially uniform as it passes through apparatus 26 from one end of the inlet side 31 to the other end. In passing to the inlet side 31 of the filter zone, a portion of the gas passes through conduit 38, as aforedescribed, carrying viscous liquid from sump 36 up the conduit to the lower side of pads 32 and 33. Some of the liquid tends to fall on the surface of apertured plate 34 where it is picked up by another portion of the gas flowing through the apertures of the plate. In passing through the apertures of plate 34, the velocity of the gas can be further regulated as abovedescribed by the flapper valve arrangement 46 so that a stabilizing effect is obtained in the event the velocity fluctuates as it enters into the second zone. After the volume of gas passes through the second zone at a uniform and substantially constant velocity from one end of the zone to the other with the dust and other particulate matter being collected from the gas by the coated filter pads 32 and 33 the cleaned gas is passed from the second zone out of the vessel 2 through gas outlet nozzle 4 of the vessel.

Having described the invention, the invention claimed is:

1. A gas cleaning apparatus comprising a vessel having a gas inlet and a gas outlet, a liquid eliminator disposed in said vessel downstream said gas inlet, a viscous impingement gas cleaning filter disposed in spaced relation from the inner wall of said vessel between said liquid eliminator and said gas outlet of said vessel with the inlet side of said gas cleaning filter extending in a plane substantially parallel to the longitudinal axis of said vessel, and gas impervious means extending across the space between said gas cleaning filter and the inner wall of said vessel to maintain the velocity of the gas uniform throughout as it passes through said gas cleaning filter and to form a seal between the periphery of said filter and the inner wall of said vessel.

2. A gas cleaning apparatus comprising a vessel having a gas inlet and a gas outlet, a liquid eliminator disposed across the interior of said vessel transverse the longitudinal axis thereof and downstream said gas inlet, a viscous impingement type gas cleaning filter disposed in spaced relation from the inner wall of said vessel between said liquid eliminator and said gas outlet of said vessel with the inlet side of said gas cleaning filter extending in a plane substantially parallel to the longitudinal axis of said vessel, and a gas impervious baffle extending across the space between said gas cleaning filter and said vessel, said baffle being positioned to provide an incrementally decreasing inlet zone adjacent said inlet side of said gas filter cleaner as said inlet side approaches the gas outlet side of said vessel and an incrementally increasing outlet zone adjacent said outlet side of said gas filter cleaner as said outlet side approaches the gas outlet side of said vessel.

3. A gas cleaning apparatus comprising a vessel having a gas inlet and a gas outlet, a liquid eliminator disposed in said vessel downstream said gas inlet, a first sump communicating with said liquid eliminator to receive liquid separated from gases passing through said eliminator, a viscous impingement type gas cleaning filter disposed in said vessel between said liquid eliminator and said gas outlet means with the inlet side of said gas cleaning filter extending in a plane substantially parallel to the longitudinal axis of said vessel, viscous liquid supply means for supply liquid to said gas cleaning filter, a second sump communicating with said gas cleaning filter to receive viscous liquid drained from said gas cleaning filter, and means to maintain the velocity of the gas uniform throughout as it passes through said gas cleaning filter.

4. A gas cleaning apparatus comprising a horizontal vessel having a gas inlet and a gas outlet, a liquid eliminator disposed across the interior of said vessel transverse the longitudinal axis thereof and downstream said gas inlet, a first liquid outlet in the lower portion of said vessel to pass off liquids separated from gases passing through said eliminator, a first sump positioned outside of said horizontal vessel in communication with said first liquid outlet, a viscous impingement type gas cleaning filter disposed in said horizontal vessel between said liquid eliminator and said gas outlet means of said vessel, said gas cleaning filter having the inlet side thereof extending in a horizontal plane substantially parallel to the longitudinal axis of said vessel and in spaced relation from the bottom of said vessel, a second liquid outlet in the lower portion of said vessel to pass off viscous liquids from said gas cleaning filter, a second sump positioned outside of said horizontal vessel in communcation with said second liquid outlet, means to control the liquid levels in said first and second liquid sumps to maintain such levels below the lower portion of said horizontal vessel, and means to cycle liquid from said second sump to said gas cleaning filter.

5. A gas cleaning apparatus comprising a horizontal vessel having a gas inlet and a gas outlet, a liquid eliminator disposed across the interior of said vessel transverse the longitudinal axis thereof and downstream said gas inlet, a first liquid outlet in the lower portion of said vessel, a trough-like funnel connecting the lower portion of said liquid eliminator to said first outlet to pass off liquids separated from gases passing through said eliminator, a first sump positioned outside said horizontal vessel in communication with said first liquid outlet, a viscous impingement type gas cleaning filter disposed in said horizontal vessel between said liquid eliminator and said gas outlet means of said vessel, said gas cleaning filter having the inlet side thereof extending in a horizontal plane substantially parallel to the longitudinal axis of said vessel and in spaced relation from the bottom of said vessel, a second liquid outlet in the lower portion of said vessel to pass off viscous liquids from said gas cleaning filter, a second sump positioned outside of said horizontal vessel in communication with said second liquid outlet, means to control the liquid level in said first and second liquid sumps to maintain such levels below the lower portion of said horizontal vessel, and means to cycle liquid from said second sump to said gas cleaning filter.

6. A gas cleaning apparatus comprising a horizontal vessel having a gas inlet and a gas outlet, a liquid eliminator disposed across the interior of said vessel transverse the longitudinal axis thereof and downstream said gas inlet, a first sump communicating with said liquid eliminator to receive liquids separated from gases passing through said eliminator, a viscous impingement type gas cleaning filter disposed in said horizontal vessel between said liquid eliminator and said gas outlet of said vessel, said gas cleaning filter having the inlet side thereof extending in a horizontal plane substantially parallel to the longitudinal axis of said vessel and in spaced relation from the bottom of said vessel, viscous liquid supply means for said gas cleaning filter, a second sump communicating with said gas cleaning filter to receive viscous liquid drained from said gas cleaning filter, and means to maintain the velocity of the gas uniform throughout as it passes through said gas cleaning filter.

7. A gas cleaning apparatus comprising a horizontal vessel having a gas inlet and a gas outlet, a liquid eliminator disposed across the interior of said vessel transverse the longitudinal axis thereof and downstream said gas inlet, a first sump communicating with said liquid eliminator to receive liquids separated from gases passing through said eliminator, a viscous impingement type gas cleaning filter disposed in said horizontal vessel between said liquid eliminator and said gas outlet of said vessel, said gas cleaning filter having the inlet side thereof extending in a horizontal plane substantially parallel to the longitudinal axis of said vessel and in spaced relation from the bottom of said vessel, a second sump communicating with said gas cleaning filter to receive viscous liquid drained therefrom, conduit means extending from said gas cleaning filter to said second sump to define a path for the flow of a portion of the total gas flow to said gas cleaning filter, said conduit means including means for admitting liquid from said second sump into its lower portion, a first gas inlet means in said conduit means for admitting a minor part of said portion of total gas flow passing through said conduit means, a second gas inlet means in said conduit for admitting the remaining major part of said portion of total gas flow passing through said conduit to said gas cleaning filter, and means to maintain the velocity of the gas uniform throughout as it passes through said gas cleaning filter.

8. A gas cleaning apparatus comprising a longitudinal vessel having a gas inlet and a gas outlet, a liquid eliminator disposed across the interior of said vessel transverse the longitudinal axis thereof and downstream said gas inlet, a first liquid outlet in the lower portion of said vessel, a trough-like funnel connecting the lower portion of said liquid eliminator to said first liquid outlet to pass off liquids separated from gases passing through said eliminator, a first sump positioned outside of said horizontal vessel in communication with said first liquid outlet, a viscous impingement type gas cleaning filter disposed in said horizontal vessel between said liquid eliminator and said gas outlet means of said vessel, said gas cleaning filter having the inlet side thereof extending in a horizontal plane substantially parallel to the longitudinal axis of said vessel and in spaced relation from the bottom of said vessel, a second liquid outlet in the lower portion of said vessel to pass off viscous liquids from said gas cleaning filter, a second sump positioned outside said horizontal vessel in communication with said second liquid outlet, valve outlet means in said first and second sumps including means to automatically control said valve outlet means and thus the liquid levels in said first and second sumps to maintain such levels below the lower portion of said horizontal vessel, means pervious to gas flow extending below said gas inlet side of said gas cleaning filter and above said second sump, a vertically disposed conduit means extending from said second sump to said means pervious to gas flow, said conduit means having liquid inlet means in its lower portion for admitting liquid from said sump thereinto, a first gas inlet means in said conduit at a point closely adjacent the operating liquid level in said conduit means, a second gas inlet means in said conduit at a point above said first gas inlet means and below said means pervious to gas flow to which said gas conduit is connected, and a baffle arrangement between said gas cleansing filter and said vessel to form a seal between the periphery of said gas cleaning filter and the inner wall of said vessel, said baffle arrangement being positioned to provide an incrementally decreasing inlet zone adjacent said inlet side of said gas filter cleaner as said inlet side approaches the gas outlet side of said vessel and an incrementally increasing outlet zone adjacent said outlet side of said gas filter cleaner as said outlet side approaches the gas outlet side of said vessel.

9. A gas cleaning apparatus comprising a vessel having spaced gas inlet and gas outlet means, a liquid eliminator disposed in said vessel downstream said gas inlet means, a dust collecting, gas cleaning filter disposed in spaced relation from the inner wall of said vessel between said liquid eliminator and said gas outlet means with the inlet side of said gas cleaning filter extending in a plane substantially parallel to the longitudinal axis of said vessel, means between said liquid eliminator and said gas inlet side of said gas cleaning filter to stabilize the velocity of the gas to be cleaned as it passes through said gas cleaning filter, and gas impervious means extending across the space between said gas cleaning filter and the inner wall of said vessel to maintain the velocity of the gas uniform throughout as it passes through said gas cleaning filter and to form a seal between the periphery of said gas cleaning filter and the inner wall of said vessel.

10. A gas cleaning apparatus comprising a vessel having a gas inlet means and a gas outlet means, a liquid eliminator disposed in said vessel downstream said gas inlet means, a filter disposed in spaced relation from the inner wall of said vessel between said liquid eliminator and said gas outlet means, said filter having its inlet side thereof extending in a plane substantially parallel to the longitudinal axis of said vessel, and gas impervious means extending across the space between said filter and said inner wall of said vessel to maintain the velocity of the gas uniform throughout as it passes through said filter, said gas impervious means forming a seal between the periphery of said filter and the inner wall of said vessel.

References Cited in the file of this patent

UNITED STATES PATENTS

| | | |
|---|---|---|
| 1,538,652 | Poth | May 19, 1925 |
| 1,559,456 | Ranyard | Oct. 27, 1925 |
| 1,772,023 | Andrews | Aug. 5, 1930 |
| 1,838,512 | Wilson | Dec. 29, 1931 |
| 1,910,728 | Waters | May 23, 1933 |
| 2,349,944 | Dixon | May 30, 1944 |
| 2,570,451 | Hottenroth | Oct. 9, 1951 |
| 2,571,331 | Blomen | Oct. 16, 1951 |
| 2,630,878 | Hopper et al. | Mar. 10, 1953 |
| 2,735,512 | Faust | Feb. 21, 1956 |
| 2,751,033 | Miller | June 19, 1956 |
| 2,812,034 | McKelvey | Nov. 5, 1957 |
| 2,889,004 | Nutting et al. | June 2, 1959 |
| 2,911,058 | Lavery | Nov. 3, 1959 |